(12) United States Patent
Jacino et al.

(10) Patent No.: US 6,685,784 B1
(45) Date of Patent: Feb. 3, 2004

(54) GLASS BREAK REPAIR KIT APPARATUS AND METHOD

(76) Inventors: Gerald Jacino, 85-19 118 St., Kew Gardens, NY (US) 11415; Anthony Jacino, 16 Briana Ct., East Moriches, NY (US) 11940

( * ) Notice: Subject to any disclaimer, the term of this patent is extended or adjusted under 35 U.S.C. 154(b) by 0 days.

(21) Appl. No.: 09/830,525

(22) PCT Filed: Oct. 29, 1999

(86) PCT No.: PCT/US99/25472

§ 371 (c)(1),
(2), (4) Date: Jul. 11, 2001

(87) PCT Pub. No.: WO00/26030

PCT Pub. Date: May 11, 2000

Related U.S. Application Data
(60) Provisional application No. 60/106,325, filed on Oct. 30, 1998.

(51) Int. Cl.[7] .............................. B32B 35/00; C03L 19/00
(52) U.S. Cl. ........................ 156/94; 425/11; 425/12; 65/28; 264/36.21
(58) Field of Search ..................... 156/94, 102, 104, 156/382; 425/11, 12, 13, 14; 65/28; 428/63; 264/36.21

(56) References Cited

U.S. PATENT DOCUMENTS

| | | | | |
|---|---|---|---|---|
| 4,138,040 A | * | 2/1979 | Stock | 222/420 |
| 4,200,478 A | | 4/1980 | Jacino et al. | 156/94 |
| 4,498,609 A | * | 2/1985 | Stock | 222/420 |
| 4,919,603 A | | 4/1990 | Herold et al. | 425/12 |
| 4,961,883 A | * | 10/1990 | Jacino et al. | 264/36.21 |
| 5,156,853 A | * | 10/1992 | Werner et al. | 425/12 |
| 5,209,935 A | * | 5/1993 | Jacino et al. | 425/12 |
| 5,776,506 A | * | 7/1998 | Thomas et al. | 425/12 |

* cited by examiner

*Primary Examiner*—Jeff H. Aftergut
*Assistant Examiner*—John T. Haran
(74) *Attorney, Agent, or Firm*—M. Arthur Auslander; Seth Natter; Natter & Natter

(57) ABSTRACT

A kit for repairing a windshield break utilizing a light activated resin includes a light impervious pedestal and resin chamber with the pedestal being placed in airtight engagement about a windshield break. The kit also includes a syringe which is couplable to an opening in the chamber. The light activated resin is carried in a light impervious container having a neck dimensioned to deposit the resin directly into the chamber before the syringe is coupled to the chamber. The kit additionally includes a light transmissive film to cover the resin filled break during curing of the resin and a light impervious patch for covering the opposite face of the windshield.

10 Claims, 4 Drawing Sheets

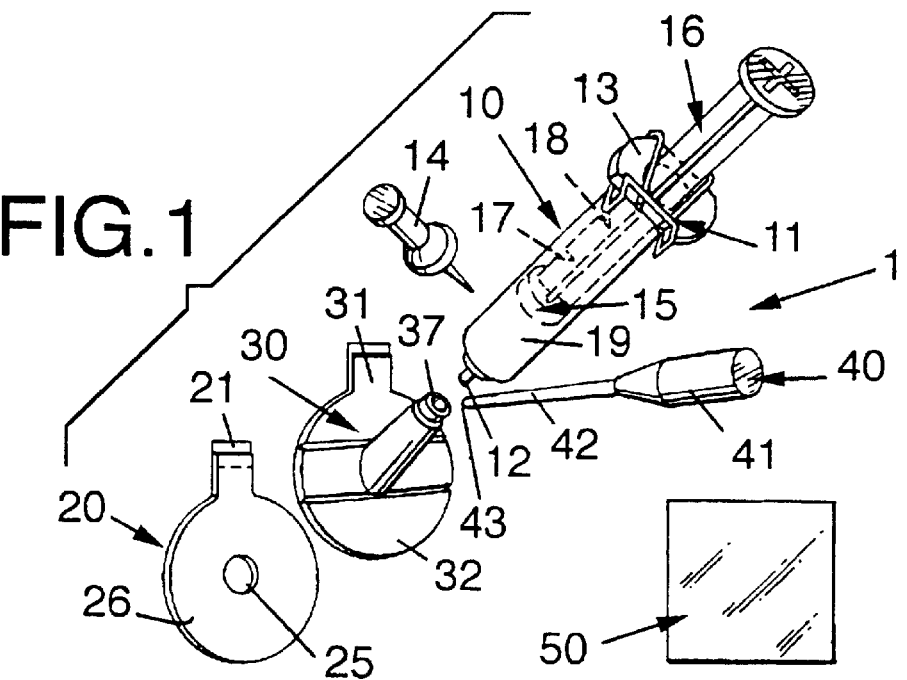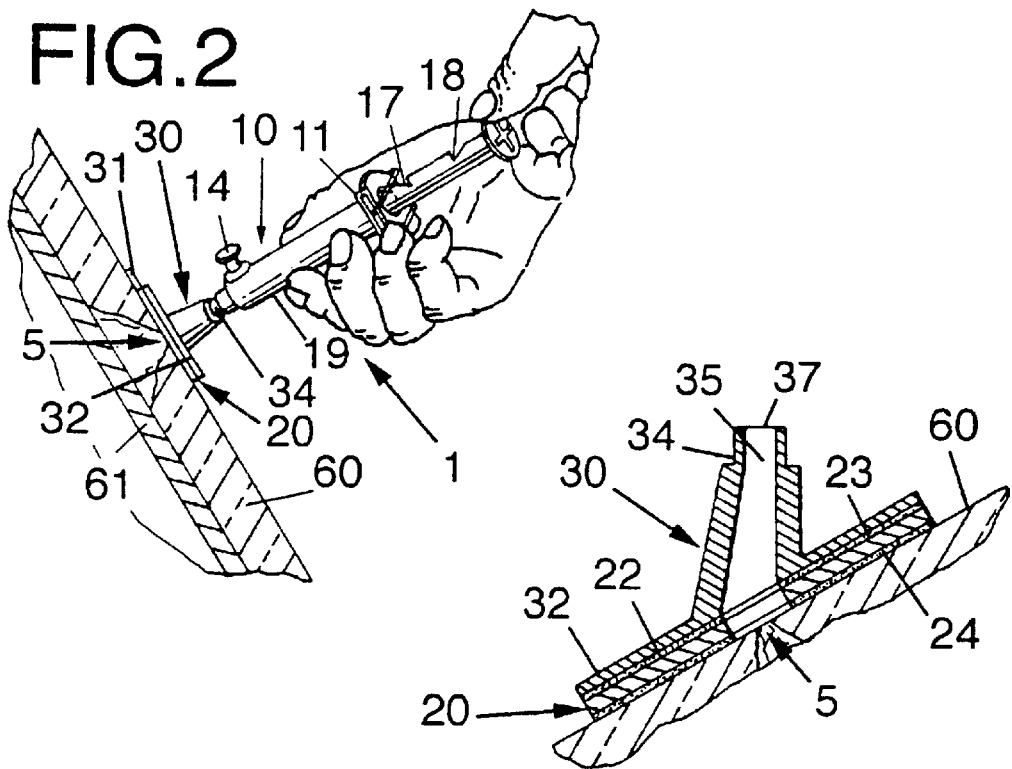

GLASS BREAK REPAIR KIT APPARATUS AND METHOD

The present application is a 371 of PCT US99/25472 filed on Oct. 29, 1999, which claims benefit to of Provisional Application No. 60/106,325, filed Oct. 30, 1998.

BACKGROUND OF THE INVENTION

The present invention relates to an improved glass break repair kit, apparatus and method. It is an improvement over U.S. Pat. No. 4,200,478.

DESCRIPTION OF THE RELATED ART

In U.S. Pat. No. 4,200,478, glass breaks or cracks in automobile windshields were repaired, substantially restoring the visibility through the glass, obviating very expensive and time consuming replacement of the entire glass which includes the break or crack.

The repair in glass breaks or cracks overcome the rough edges of the area and the crack striations refracting light in patterns different from the normal refraction of the glass, impeding or destroying the normal visibility of the glass. The windshield is made of safety glass.

Safety glass is usually a lamination of two plates of glass sandwiching a transparent binder. A crack in a windshield usually only affects the outer plate of the lamination and does not go through the entire lamination. The transparent binder is usually ultraviolet light impervious.

The glass breaks were filled with transparent resin which protected the formerly broken areas and which substantially restored the visibility to the repaired area. The repair included a pedestal mountable over a break. The pedestal received a syringe which was sealed to the pedestal and was used to fill the crack with mixed transparent resin with a timed curing agent. In the past, the simplicity of the use of a syringe with a pedestal and its efficiency for pumping and drawing vacuum was a great advance in the technology.

The flange on the pedestal served as an effective interface between the seal and the glass with the break.

The present invention is an improvement of U.S. Pat. No. 4,200,478 for performing a repair with a light curable resin. The elements of the present invention are particularly adaptable for sale and display in a kit in a blister pack.

U.S. Pat. No. 4,919,603 shows a similar glass repair system employing a pre-filled light curable resin in a syringe. The syringe is mechanically and physically limited in its ability to create a pressure and/or vacuum.

SUMMARY OF THE INVENTION

According to the present invention, a repair kit, apparatus and method include a syringe, pedestal, seal and light curable resin in a dispenser for the repair of a break in safety glass. The invention is an improvement over U.S. Pat. No. 4,200,478.

In one embodiment the present invention enables the repair kit, apparatus and method to repair breaks in a windshield's glass, outside in ambient light, employing a light curable resin. The light curable resin is selected to cure in normal daylight. The elements of the present invention allow normal working of the repair, protecting the resin until the steps for repair are completed, before being fully exposed to the normal curing daylight or a selected curing light.

The syringe does not have to be loaded with the curing resin. The syringe has the prior art multiple use of the plunger for drawing of vacuum and creating pressure without the fouling by the introduction of the resin and is reusable.

The apparatus includes a pedestal with a flange and a chamber. The chamber has two openings, one of the openings is in the flange, the other opening functionally receives a syringe in airtight engagement. The chamber is of sufficient size to act as a reservoir for glass repair resin. An adhesive seals the pedestal in airtight engagement over a break in glass. The pedestal is opaque. The pedestal as used in the present invention may be reusable.

The method for repairing a break in glass includes the steps of providing an opaque pedestal including a flange and a chamber. The chamber is of sufficient size to act as a reservoir for the glass repair resin. The chamber has two openings, one opening in the flange, the other opening functionally engagable with the syringe which includes a plunger with a stem. The stem may or may not include a retaining means. A valve means is provided. No resin is intended to engage in the syringe.

The flange and the chamber of the pedestal are opaque. The pedestal is adhesively sealed at its flange in airtight engagement over a break in glass with the chamber in substantial communication with the glass break. Glass repair resin is placed in the chamber from a resin dispensing container. The valve is engaged, airtight between the chamber and the syringe. The plunger is selectively actuated with regard to the body of the syringe so that the valve can communicate the syringe with the chamber to seal the syringe so that a vacuum is created and the resin is drawn into the break in the glass.

One method includes the steps of transferring the resin into the pedestal chamber, removing the excess resin and providing a smooth outer surface of the repair and curing the resin.

The repair can be performed with resin, including an ultraviolet light hardening initiator or natural light initiator. Curing can be in natural light, or with ultraviolet light, depending upon the weather conditions and the initiator in the resin.

Curing of a resin with ultraviolet may be induced with an ultraviolet lamp. Ultraviolet curing cannot be effected from the inside of the windshield, since the liner of the safety glass is ultraviolet impervious. A natural light windshield repair from inside the windshield may be effected where the resin includes a natural light initiator and may also include an ultra violet light initiator. The ultraviolet initiator is passive to the ambient light.

There is a distinct advantage in effecting a repair from the inside of the windshield, since a natural light repair then starts the curing at the outer edges of the repair, thus, maximizing the amount of resin cured about the break and drawing a maximum amount of resin to fill all of the break. The inside repair requires use of the opaque resin dispensing container and pedestal. The pressure also protects against uncured resin from flowing the from some breaks.

The greater amount of resin in the break, the less possibility of unwanted refraction of the light from the repaired area. The repair is also more secure.

The provision of a resin with both ultraviolet initiator and natural light initiator does not affect the ability to perform the ultraviolet repair, which can only be performed from the outside of the windshield, since the liner is impervious to ultraviolet.

A windshield repair, with natural light or the non ultraviolet light source on the inside of the windshield, in the vehicle, better enables more and effective pressure and vacuum, filling resin into the break from the outside of the break and enables curing from the outer edge of the break, thus drawing more resin onto the repair.

The light source repair from inside the windshield, may also be effected under higher vacuum and/or pressure, using the vacuum and pressure accumulation, as shown in U.S. Pat. No. 4,961,883.

BRIEF DESCRIPTION OF THE DRAWING

Although such novel feature or features believed to be characteristic of the invention are pointed out in the claims, the invention and the manner in which it may be carried out may be further understood by reference to the description following and the accompanying drawings.

FIG. 1 is an exploded view of the working elements of one embodiment of the kit, apparatus and method of the present invention.

FIG. 2 is a schematic partially cut away section of broken safety glass with a mounted pedestal and a syringe connected to the pedestal for performing a repair.

FIG. 2a is a schematic cut away detail section of a pedestal mounted over a seal over broken safety glass.

DESCRIPTION OF THE FIGURES

Figure 3:
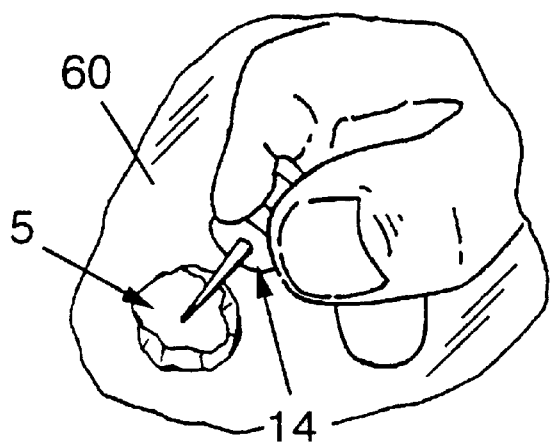
FIG. 3 shows a detail of the step of cleaning the damaged area.

Referring now the figures in greater detail, where like reference numbers denote like parts in the various figures.

The glass repair apparatus 1, as shown in FIGS. 1 and 2a, comprises a syringe 10, a seal 20, a pedestal 30, a resin dispensing container 40 and a clear curing film 50. The seal 20 has a tab 21, an air impermeable layer 22, an air impermeable adhesive 23 on one side of the air impermeable layer 22, an air impermeable adhesive 24 on the other side of the air impermeable layer 22, an outer release sheet 26 on the air impermeable layer 22 and an outer release sheet (not shown) on the other side of the air impermeable layer 22.

The pedestal 30 has a tab 31, a flange portion 32, an air impermeable adhesive 33 usually covered by an outer release sheet 36, a neck 34, a neck end 37 and a chamber 35. The pedestal 30 may have an air impermeable adhesive (not shown) on the underside of the flange portion 32. The pedestal 30 including the chamber 35 and flange portion 32 must be opaque. The flange portion 32 may be rendered opaque by the seal 20.

The syringe 10 as shown in FIG. 1 has a latch 11, an end 12, flange 13, a plunger 15, a stem 16, a lower notch 17, an upper notch 18 and a body 19. There is a push pin 14 engagable in an opening (not shown) that acts as a valve in the body 19 of the syringe 10.

The seal 20, as shown in FIG. 2a, has an air impermeable layer 22 surrounded by an air impermeable adhesive 23 on one side and another air impermeable adhesive 24 on the other side. The seal 20 has a central opening 25.

The seal 20, as shown in FIG. 1, has a tab 21, an outer release sheet (not shown) over the air impermeable layer 22, air impermeable adhesive 23 and air impermeable adhesive 24 (not shown) in FIG. 1.

The resin dispensing container 40, as shown in FIG. 1, has a bulb 41 and a hollow tube 42 fused at its end 43. The resin dispensing container 40 holds a selected amount of a light curable resin (not shown). The bulb 41 is flexible so that it can act as a dropper. The resin dispensing container 40 is completely opaque so that no exposure of the resin dispensing container 40, to light, will prematurely cure the light curable resin within.

Figure 4:
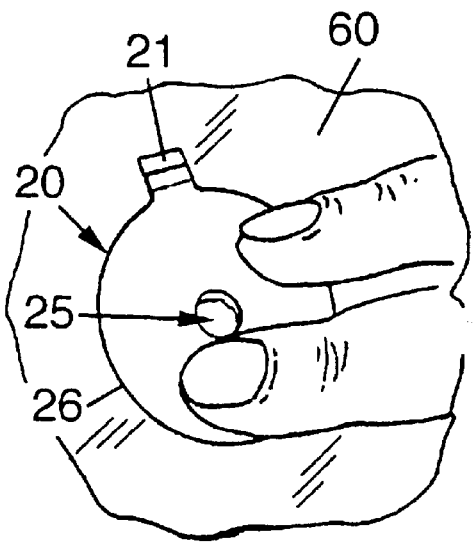
FIG. 4 shows a detail of the step of emplacing the seal over the glass break.

As shown in FIG. 3, in repairing a break 5 in a windshield, the push pin 14 is used to clean out any loose glass particles from the center of the break 5. Then, as shown in FIG. 4, seal 20 with the tab 21 upward on the windshield 60, and with its outer release sheet 26 is exposed. The seal 20 is emplaced, surrounding the break 5 within the central opening 25. The underside release sheet (not shown) of the seal 20 has already been removed, exposing the air impermeable adhesive 24 (now shown) to adhere to the windshield 60.

Figure 5:
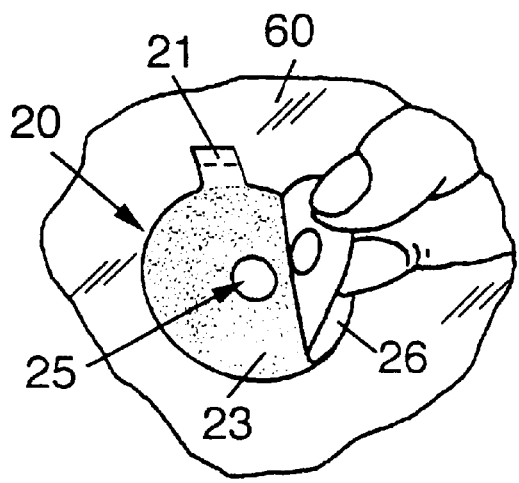
FIG. 5 shows a detail of the step of removing a release sheet of the seal.
Figure 6:
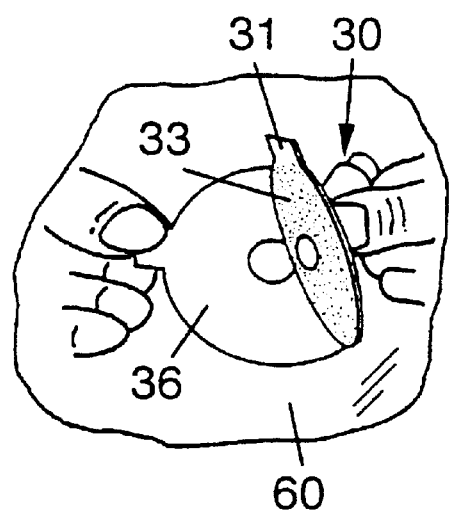
FIG. 6 shows a detail of the step of removing a release sheet of the pedestal.
Figure 7:
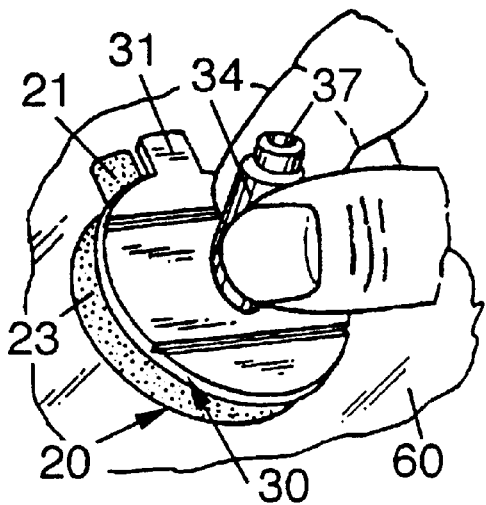
FIG. 7 shows a detail of the step of placing the pedestal over the seal at the glass break.

Then, as shown in FIG. 5, the outer release sheet 26 is removed, exposing the air impermeable adhesive 24 of the seal 20. In FIG. 6, the outer release sheet 36 of the pedestal 30 is removed, exposing the air impermeable adhesive 33 of the pedestal 30 and in FIG. 7, the pedestal 30 has its tab 31 aligned with the tab 21 of the seal 20, then emplaced with the air impermeable adhesive 33 of the pedestal 30 engaging the air impermeable adhesive 23 of the seal 20, as shown in FIG. 7.

Figure 8:
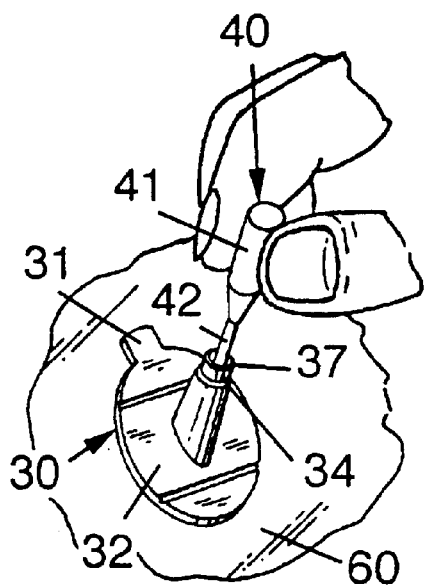
FIG. 8 shows a detail of the step of inserting the resin into the chamber of the pedestal.

The sealed end 43 of the resin dispensing container 40 as can best be seen in FIG. 1 is then cut off, (not shown) allowing the light curable resin inside the bulb 41 to be dispensed into the opaque chamber 35 of the emplaced pedestal 30, as shown in FIG. 8.

Figure 9:
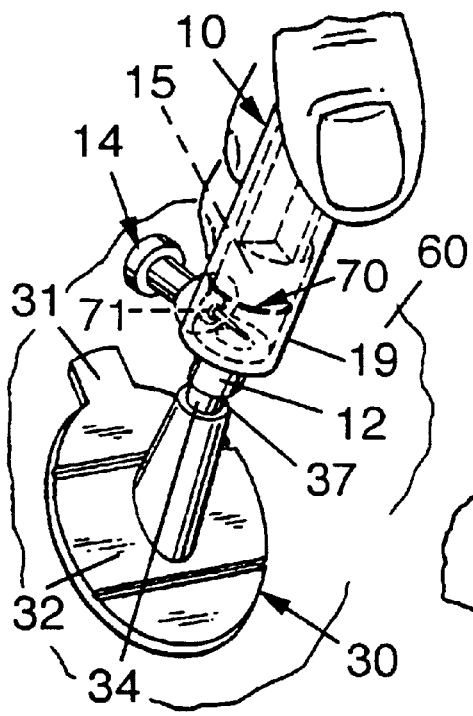
FIG. 9 shows a detail of the step of emplacing a syringe at the chamber in the pedestal.

As shown in FIG. 9, when using the syringe 10, the end 12 of the syringe 10 is engaged over the neck 34 of the pedestal 30. When the syringe 10 and pedestal 30 are engaged, it is important that the plunger 15 be placed at a marking indicator 70 and the push pin 14 engaged in an opening 71 in the body 19, so that the syringe 10 is sealed, so that a vacuum is drawn, as shown in FIG. 2.

Figure 10:
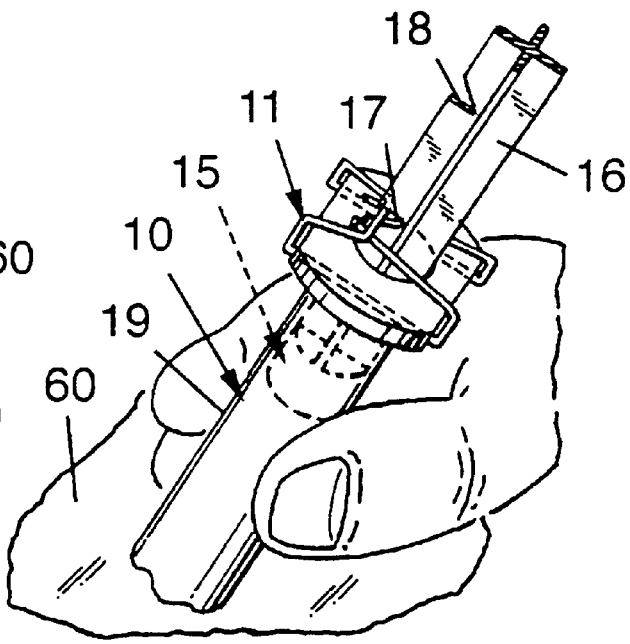
FIG. 10 shows a detail of the step of locking the stem of the syringe to draw a vacuum.

As shown in FIG. 10, the stem 16 of the syringe 10 is withdrawn, raising the plunger 15. The latch 11 is engaged with the lower notch 17 and held. This sucks the air out of the break 5, drawing the light curing resin into the break 5.

By removing and replacing the push pin 14, the stem 16, with the plunger 15, is depressed to hold pressure. Engaging the lower notch 17 with the latch 11 then holds the light curing resin in the break 5 to better fill the break 5. The vacuum and pressure steps can be selectively repeated as meets the requirements of the repair.

The vacuum-pressure cycle both draws out the air and replaces it with the resin. The vacuum cycle will get most of the resin into the break and even into the striations. The resin, once in the striations, gives a uniform refraction and generally clear visibility through the striation and break.

Figure 11:
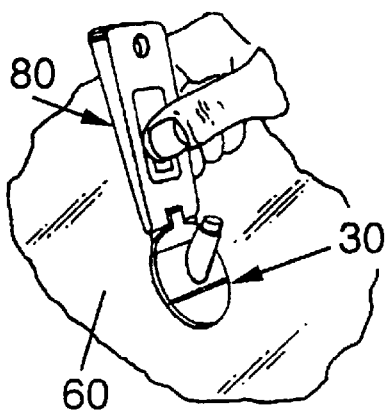
FIG. 11 shows a detail of the step of removing the pedestal and seal after the resin has cured.
Figure 12:
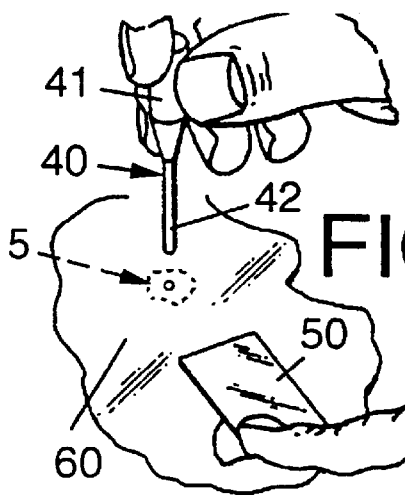
FIG. 12 shows a detail of the step of filling the center of the break and placing the curing film over the break.

Once the vacuum-pressure cycle has been completed, the syringe 10 is removed from the pedestal 30. The resin dispensing container 40 can then be used to remove any excess light curing resin in the chamber 35. Then the pedestal 30 is carefully removed from the windshield 60, using a sharp blade, such as a razor blade, as shown with the razor blade tool 80, as shown in FIG. 11. The excess light curing resin should be removed from the windshield 60. As shown in FIG. 12, the break 5 should be touched up with light curing resins from the resin dispensing container 40 by slowly squeezing a drop into the break 5, then placing the clear curing film 50 over the center of the break 5 to hold the light curing resin in.

Figure 13:
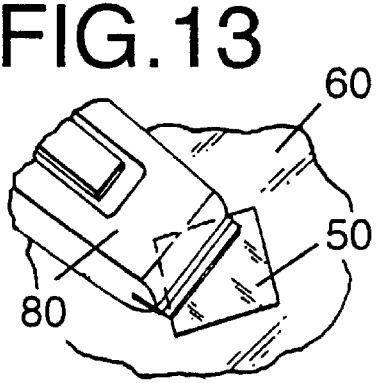
FIG. 13 shows a detail of the step of clearing the film of bubbles.
Figure 14:
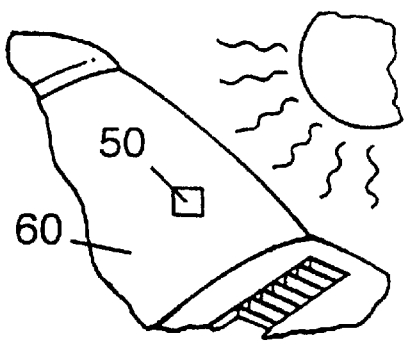
FIG. 14 shows a detail of the step of curing the resin in sunlight.

As shown in FIG. 13, the razor blade tool 80 is run over the clear curing film 50 as a squeegee. The repair can then be left in normal sunlight, as shown in FIG. 14, to cure the resin, or an ultraviolet light employed where the used resin includes at least an ultra violet curing initiator.

Figure 15:
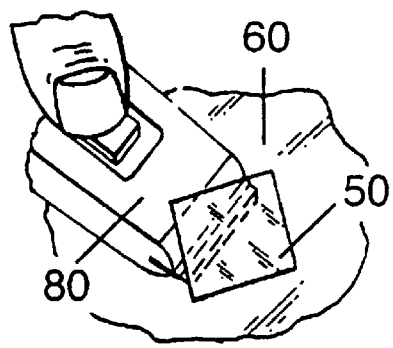
FIG. 15 shows a detail of the step of removing the film and cleaning the surface of the windshield.

As shown in FIG. 15, the razor blade tool 80 may be used to remove the clear curing film 50 and to remove any excess resin on the windshield 60. The windshield 60 may then be cleaned with a glass cleaner.

The clear curing film 50 enables a clear repair and the light to properly reach the resin once in place. There are further unexpected advantages of the present invention, the syringe 10 at least, may be reusable and unfold by the curing resin.

The repair steps as shown in FIGS. 11–15 improve the outer surface quality of the repair by providing a smooth surface to the windshield 60.

The repair as shown in FIGS. 1–15 can be done in natural light with a resin including a natural light initiator. The resin may also include an ultra violet initiator. The initiators do not interfere with each others functioning and allow multiple use. The natural light repair is enabled by the capacity of the resin dispensing container 40, pedestal 30, flange portion 32 and seal 20. The steps of the repair are carried out without risk of premature curing before the resin is fully infused. The curing can bedone with natural light, sun light, artificial light, the ultra violet sun rays or with an ultra violet lamp.

The ultraviolet imperviousness of the liner 61 prevents curing from the inside of the windshield, or from inside a vehicle.

Figure 16:
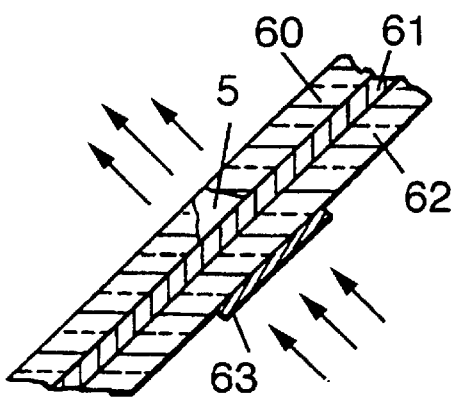
FIG. 16 shows a section through broken windshield.

FIG. 16 shows a section through the windshield 60, including the liner 61 and inner glass 62, the arrows showing the light path from within the vehicle. There is a lightproof patch 63, shown, which is removably attachable to protect the resin from prematurely hardening before the full amount of the resin is in place. The lightproof patch 63 must be used where a repair is performed from the inside of the windshield 60. When the repair is performed from the inside of the windshield the resin must include at least a natural light curing initiator.

A natural light repair from the inside of the windshield bypasses the ultra violet imperviousness of the liner 61. The opacity of the pedestal 30 protects the resin from premature curing on the outside of the windshield 60. The resin is protected from ambient light by the lightproof patch 63 on the inside of the windshield 60 and the opacity of the pedestal 30 and chamber 35.

Initiating the curing from the inner glass 62 enables the curing to start from the out periphery of the resin in the break 5. This maximizes the resin cured and also help draw more resin into the break and its striations particularly when the resin is under pressure. The syringe 10 can be used to generate pressure as hereinbefore set forth.

Vacuum can also be accumulate as set forth in U.S. Pat. No. 4,961,883.

The opacity of the resin dispensing container 40, with its sealed end 43, enables the use of a light curing resin for a glass break repair at the convenience of the repairer. In a kit form, the glass repair glass repair apparatus 1 is boxed or mounted on a blister pack, until ready for use. Thus, the opacity of the resin dispensing container 40 requires no special precautions in storage. Even in a repair, the opacity of the resin dispensing container 40 allows the use of a low viscosity resin, which can more easily flow to better fill a break 5.

The opacity of the resin dispensing container 40 allows a leisurely repair, under most normal lighting conditions, without risking the premature curing of the resin.

Although windshields have been repaired with apparatus similar to what is used in the present invention under U.S. Pat. No. 4,200,478 since 1978, and light curing resins are known, the use of the opaque resin dispensing container 40 and the clear curing film 50 has unexpectedly added a new dimension to windshield repair with light curing resin.

The resin dispensing container 40 differs from the prior art in that for best results, it must also be opaque. The seal 20, air impermeable layer 22, at least for best results, must also be opaque.

The seal 20 includes a air impermeable layer 22, an air impermeable adhesive 23 and another air impermeable adhesive 24. Convenience of use dictates the outer release sheet 26 and the inner release sheet (not shown) for the seal 20 to protect the seal 20 when not actually in use and to be able to store the seal 20 and also use it in a kit form. The same holds true with regard to the air impermeable adhesive 33 and outer release sheet 36 of the pedestal 30. Essentially, the configuration of FIG. 2a can affect the repair of the present invention without the multiple adhesive seal configurations.

As shown in FIG. 16, the lightproof seal 63 prevents the passage of natural light during a repair. Once the resin has been satisfactorily engaged in place with the break, with selected pressure and vacuum applied to disburse the resin into the edges of the break 5, the lightproof seal 63 is removed. Natural light, or selected curing light, cures the resin. The curing starts from the outside of the break, thus drawing in more resin from the resin chamber 35, improving the repair.

The special configuration of the present invention also allows the use of the pedestal for further repair.

In the present invention a low viscosity resin may be used in repairing a break. The repair can be made from the inside of the windshield, inside a vehicle. The low viscosity enables the resin to better penetrate the break both under pressure and under vacuum. The initiating of the curing from within the vehicle, the inside of the windshield, further improves the repair. The resin start to cure at the outer periphery of the break on the inside of the outside layer of the windshield 60.

The terms and expressions which are employed are used as terms of description; it is recognized, though that various modifications are possible.

It is also understood the following claims are intended to cover all of the generic and specific features of the invention herein described; and all statements of the scope of the invention which as a matter of language, might fall therebetween.

What is claimed is:

1. In a kit for effecting a windshield repair, the kit comprising a pedestal for airtight emplacement on one face of the windshield, about a windshield break in need of repair, a chamber in fluid tight communication with the pedestal and a syringe in selective fluid tight communication with an opening in the chamber, the improvement comprising; the pedestal and the chamber being light impervious, the chamber having a capacity to carry a low viscosity light activated resin sufficient to complete the repair, a light impervious container carrying a sufficient volume of low viscosity light activated resin to complete the repair, the container having a neck dimensioned to deposit the low viscosity light activated resin directly into the chamber through the opening and a light impervious patch adapted to cover the opposite face of the windshield in registration with the break to preclude premature activation of the resin.

2. In a kit for effecting a windshield repair as constructed in accordance with claim 1, the improvement further comprising a seal for effecting the airtight emplacement of the pedestal on the one face, the seal including an aperture registrable with the break, the seal further including a registration tab projecting therefrom, the pedestal including an engagement surface registrable with the seal, the engagement surface having a mating registration tab projecting therefrom.

3. In a kit for effecting a windshield repair as constructed in accordance with claim 1, the improvement further comprising a clear curing film for placement on the one face over the break after the light activated resin has been emplaced within the break.

4. A method of effecting a repair of a break in a windshield employing a kit constructed in accordance with claim 1, the method comprising the steps of:

a) placing the pedestal in airtight engagement about a break on one face of the windshield, b) applying the light impervious patch to the opposite face of the windshield, c) discharging a quantity of the low viscosity light activated resin from the container neck directly into the chamber, d) employing the syringe to evacuate air from the break, e) filling the break with the low viscosity light activated resin carried in the chamber, and f) curing the light activated resin.

5. A method of effecting a repair of a break in a windshield in accordance with claim 4 wherein step e) is practiced by utilizing the syringe to force the low viscosity light activated resin into the break under pressure.

6. A method of effecting a repair of a break in a windshield, the method comprising the steps of:

a) placing a light impervious pedestal in airtight engagement about a break on one face of the windshield, b) providing a light impervious chamber in fluid tight communication with the pedestal, c) providing a quantity of light activated resin within a light impervious container having a neck, d) providing a light impervious patch, e) discharging a quantity of light activated resin from the container through the neck and directly into the chamber, f) coupling a source of vacuum to the chamber to evacuate air from the break, g) filling the break with the light activated resin carried in the chamber, and h) applying the light impervious patch to the opposite face of the windshield in registration with the break prior to practicing step e) or g).

7. A method of effecting a repair of a break in a windshield in accordance with claim 6 further including the steps of:

i) removing the pedestal from the one face, and j) covering the filled break with a light transmissive film to facilitate activation of the light activated resin.

8. A method of effecting a repair of a break in a windshield in accordance with claim 6 further including the step of removing the light impervious patch after the break has been filled with resin.

9. A method of effecting a repair of a break in a windshield in accordance with claim 7 further including the step of filling any depression or void in the break by applying additional light activated resin directly from the container neck into the break prior to practicing step j).

10. A method of effecting a repair of a break in a windshield in accordance with claim 7 further including the steps of providing a projecting tab on the pedestal, the step of removing the pedestal from the one face including inserting a blade between the one face and the pedestal at the tab.

* * * * *